(12) United States Patent
Chen (10) Patent No.: US 7,529,024 B1
(45) Date of Patent: May 5, 2009

(54) POLARIZATION CONVERSION SYSTEM AND ILLUMINATION MODULE

(75) Inventor: Sung-Nan Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 12/208,623

(22) Filed: Sep. 11, 2008

(30) Foreign Application Priority Data

Feb. 12, 2008 (TW) .................................. 97104834

(51) Int. Cl.
  G02B 5/30 (2006.01)
  G02B 27/28 (2006.01)
  G03B 21/14 (2006.01)
  G03B 21/28 (2006.01)

(52) U.S. Cl. ........................ 359/487; 359/495; 359/496; 359/497; 359/502; 353/20; 353/33; 353/81; 353/99; 362/19

(58) Field of Classification Search ................. 359/487, 359/495, 490, 496, 497, 502, 634; 362/19; 349/9; 353/20, 33, 81, 98, 99
See application file for complete search history.

(56) References Cited

U.S. PATENT DOCUMENTS

| | | | | |
|---|---|---|---|---|
| 2,748,659 A | * | 6/1956 | Schroder et al. | 359/487 |
| 5,283,600 A | * | 2/1994 | Imai | 353/34 |
| 5,555,186 A | * | 9/1996 | Shioya | 349/9 |
| 5,566,367 A | * | 10/1996 | Mitsutake et al. | 359/497 |
| 5,650,873 A | * | 7/1997 | Gal et al. | 359/487 |
| 5,729,306 A | * | 3/1998 | Miyake et al. | 349/9 |
| 6,084,714 A | * | 7/2000 | Ushiyama et al. | 359/627 |
| 6,318,863 B1 | * | 11/2001 | Tiao et al. | 353/31 |
| 6,384,972 B1 | * | 5/2002 | Chuang | 359/495 |
| 6,726,329 B2 | * | 4/2004 | Li et al. | 353/20 |
| 2005/0200812 A1 | * | 9/2005 | Sakata et al. | 353/20 |
| 2006/0007538 A1 | * | 1/2006 | Robinson | 359/494 |
| 2008/0018999 A1 | * | 1/2008 | Schuck et al. | 359/495 |

* cited by examiner

Primary Examiner—Ricky D Shafer
(74) Attorney, Agent, or Firm—J.C. Patents (57) ABSTRACT

A polarization conversion system includes at least one beam splitting and combining unit having a polarization beam splitting element and a dichroic element, a dichroic unit, a polarization beam splitting unit, a first half wave plate (HWP) and a second half wave plate. The polarization beam splitting element reflects a first portion beam of the first light beam and allows a second portion beam of the first light beam to pass through. The dichroic unit reflects the first portion beam. The polarization beam splitting unit reflects a third portion beam of a second light beam and allows a fourth portion beam of the second light beam to pass through, and the dichroic element reflects the third portion beam. In addition, the first HWP is disposed between the beam splitting and combining unit and the polarization beam splitting unit, while the second HWP is disposed between the beam splitting and combining unit and the dichroic unit.

19 Claims, 8 Drawing Sheets

POLARIZATION CONVERSION SYSTEM AND ILLUMINATION MODULE

CROSS-REFERENCE TO RELATED APPLICATION

This application claims the priority benefit of Taiwan application serial no. 97104834, filed on Feb. 12, 2008. The entirety of the above-mentioned patent application is hereby incorporated by reference herein and made a part of specification.

BACKGROUND OF THE INVENTION

1. Field of the Invention

The present invention generally relates to a projection apparatus, and more particularly, to a polarization conversion system and an illumination module having the polarization conversion system.

2. Description of Related Art

Figure 1:
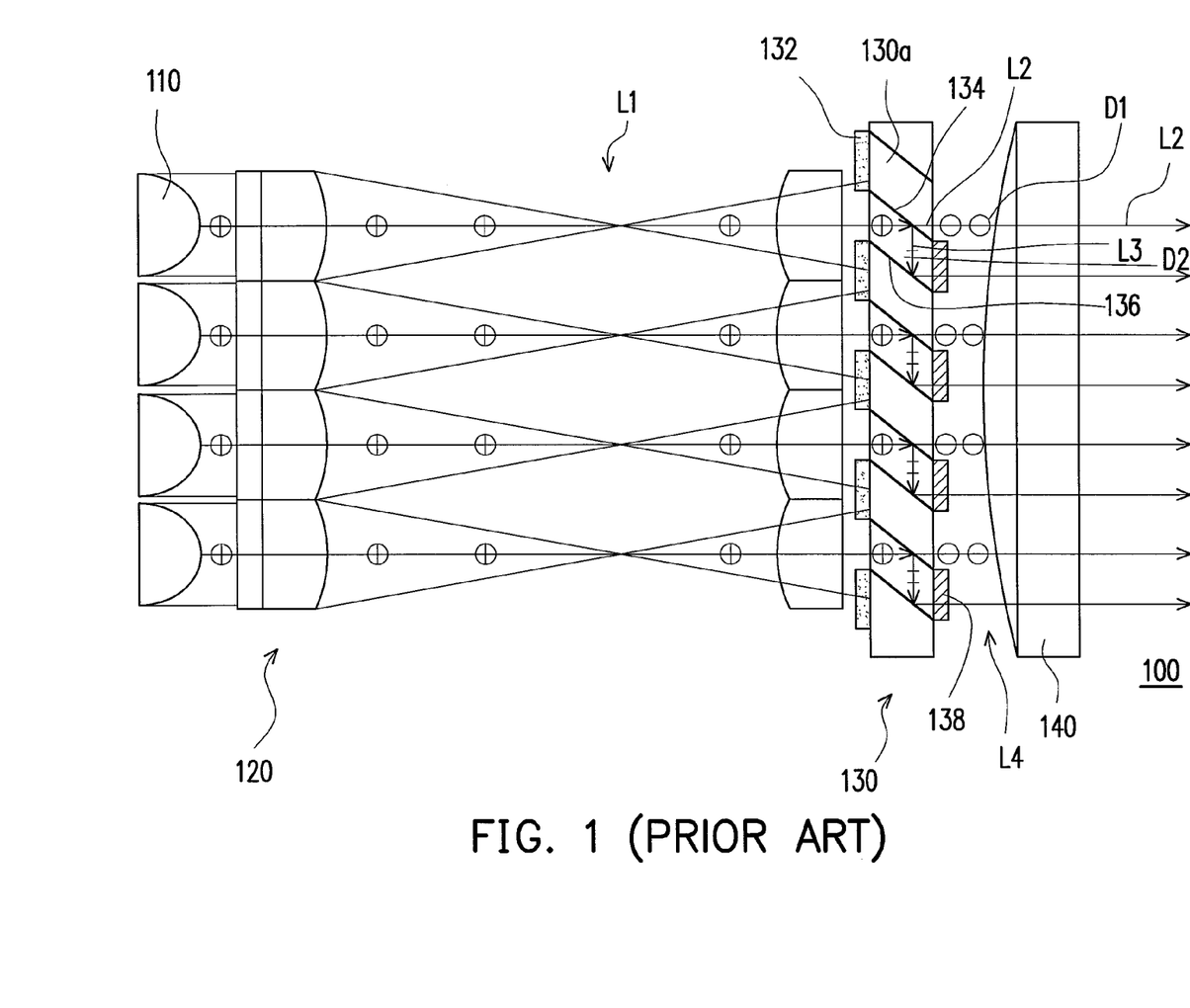
FIG. 1 is a diagram of a conventional illumination module.

FIG. 1 is a diagram of a conventional illumination module. Referring to FIG. 1, an illumination module 100 includes a plurality of light sources 110, a lens array 120, a polarization conversion system 130 and a lens 140. The light sources 110 emit a plurality of non-polarized beams L1, and after the non-polarized beams L1 pass through the lens array 120 and are uniformed by the lens array 120, the non-polarized beams L1 are incident upon the polarization conversion system 130 and each of the non-polarized beams L1 is converted into a polarized beam L4 by the polarization conversion system 130. The lens 140 is disposed in the optical paths of the polarized beams L4.

The polarization conversion system 130 has a plurality of prisms 130a, a plurality of absorbing elements 132, a plurality of polarization beam splitting films (PBS films) 134, a plurality of reflection films 136 (also may be a plurality of polarization beam splitting films) and a plurality of half wave plates 138. The absorbing elements 132, the PBS films 134, the reflection films 136 and the half wave plates 138 are disposed on the prism 130a. As the non-polarized beams L1 are incident upon the polarization conversion system 130, the PBS films 134 respectively make each of the non-polarized beams L1 split into a first light beam L2 with a first polarization D1 and a second light beam L3 with a second polarization D2. The first light beams L2 respectively pass through one of the PBS films 134. The second light beams L2 are sequentially and respectively reflected by one of the PBS films 134 and reflected by one of the reflection films 136. Then, second light beams L2 pass through the half wave plates 138 and are respectively converted into another second light beam L3 with the first polarization D1. The first light beam L2 from the PBS film 134 and the second light beam L3 from the half wave plate 138 are merged into a polarized beam L4 with the first polarization D1.

If the non-polarized beams L1 are incident not upon the PBS films 134, a portion of the non-polarized beams L1 with the second polarization D2 may be emitted from the polarization conversion system 130, and the portion of the non-polarized beams L1 with the second polarization D2 are mixed up with the polarized beams L4, which would degrade the image quality of the projection apparatus using the illumination module 100. Therefore, the absorbing elements 132 are employed to block the non-polarized beams L1 from entering the polarization conversion system 130. However, the absorbing elements 132 prevent the non-polarized beams L1 from entering the polarization conversion system 130. In more detail, as the non-polarized beams L1 are incident upon the polarization conversion system 130, if the non-polarized beams L1 incident upon the lens array 120 are not parallel light beams, the non-polarized beams L1 would be incident upon the lens array 120 with a small incidence angle, which may enlarge the cross-section area of each of the non-polarized beams L1 after passing through the lens array 120 but prior to entering the polarization conversion system 130; thus, each of the non-polarized beams L1 is unable to completely propagate to the PBS film 134, so that a portion of the non-polarized beam L1 is absorbed by the absorbing element 132 resulting in an energy loss and a reduced optical performance of the light sources 110.

SUMMARY OF THE INVENTION

Accordingly, the present invention provides a polarization conversion system having better optical performance and a smaller volume.

The present invention also provides an illumination module having the above-mentioned polarization conversion system.

An embodiment of the present invention provides a polarization conversion system for converting at least one non-polarized first light beam and a non-polarized second light beam into a polarized beam. The polarization conversion system includes at least one beam splitting and combining unit, a dichroic unit, a polarization beam splitting unit (PBS unit), a first half wave plate and a second half wave plate. The beam splitting and combining unit includes a polarization beam splitting element (PBS element) and a dichroic element. The PBS element reflects a first portion beam of a first light beam and allows a second portion beam of the first light beam to pass through. The dichroic element and the PBS element are disposed substantially in parallel to each other and allow the first light beam to pass through. The dichroic unit is disposed at a side of the beam splitting and combining unit to reflect the first portion beam of the first light beam; the PBS unit is disposed at another side of the beam splitting and combining unit to reflect a third portion beam of the second light beam and allow a fourth portion beam of the second light beam to pass through. The dichroic element herein reflects the third portion beam from the PBS element. The first half wave plate is disposed between the beam splitting and combining unit and the PBS unit to convert the polarization of the third portion beam of the second light beam, and the second half wave plate is disposed between the beam splitting and combining unit and the dichroic unit to convert the polarization of the first portion beam of the first light beam, wherein the first portion beam, the second portion beam, the third portion beam and the fourth portion beam after passing through the polarization conversion system form a polarized beam.

In an embodiment of the present invention, the above-mentioned polarization conversion system further includes at least one third half wave plate, the number of at least the first light beam herein is 2, the number of at least one beam splitting and combining unit is 2, each the first light beam is incident upon each the beam splitting and combining unit and the third half wave plate is disposed between the two beam splitting and combining units.

In an embodiment of the present invention, the above-mentioned beam splitting and combining unit further includes an optical medium disposed between the PBS element and the dichroic element. In addition, the above-mentioned dichroic element may be disposed in the optical path of the first portion beam and located between the first half wave plate and the PBS element. Further, the above-mentioned PBS unit is a polarization beam splitting prism (PBS prism)

and the above-mentioned dichroic unit is a dichroic prism. Moreover, the dichroic unit, the beam splitting and combining unit and the PBS unit are substantially the same in volume. An embodiment of the present invention further provides an illumination module, which includes at least one first dot light source, a second dot light source, the above-mentioned polarization conversion system and a light-uniforming unit. The first dot light source is suitable for emitting a non-polarized first light beam and the second dot light source is suitable for emitting a non-polarized second light beam. The polarization conversion system is suitable for converting the first light beam and the second light beam into a polarized-light beam. The light-uniforming unit is disposed in the optical paths of the first light beam and the second light beam.

In an embodiment of the present invention, the above-mentioned light-uniforming unit is disposed in the optical path of the polarized beam, wherein the light-uniforming unit can includes a lens array. In addition, the light-uniforming unit may also include a focusing lens and a light integration rod, wherein the focusing lens is disposed in the optical path of the polarized light beam and the light integration rod is disposed in the optical path of the polarized light beam from the focusing lens.

In an embodiment of the present invention, the above-mentioned light-uniforming unit is disposed between the first dot light source and the polarization conversion system as well as between the second dot light source and the polarization conversion system, wherein the light-uniforming unit may include a lens array.

Based on the above described, in the above-mentioned embodiments of the present invention, the first light beam and the second light beam are respectively incident upon the beam splitting and combining unit and the PBS unit such that the polarization conversion system does not require absorbing elements to block the non-polarized light. Therefore, the first light beam and the second light beam come from the light sources are able to enter the polarization conversion system with a higher proportionality, which thereby promotes the optical efficiency of the first light beam and the second light beam and further promotes the optical performance of the illumination module and the display quality of the projection apparatus employing the illumination module. Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2A:
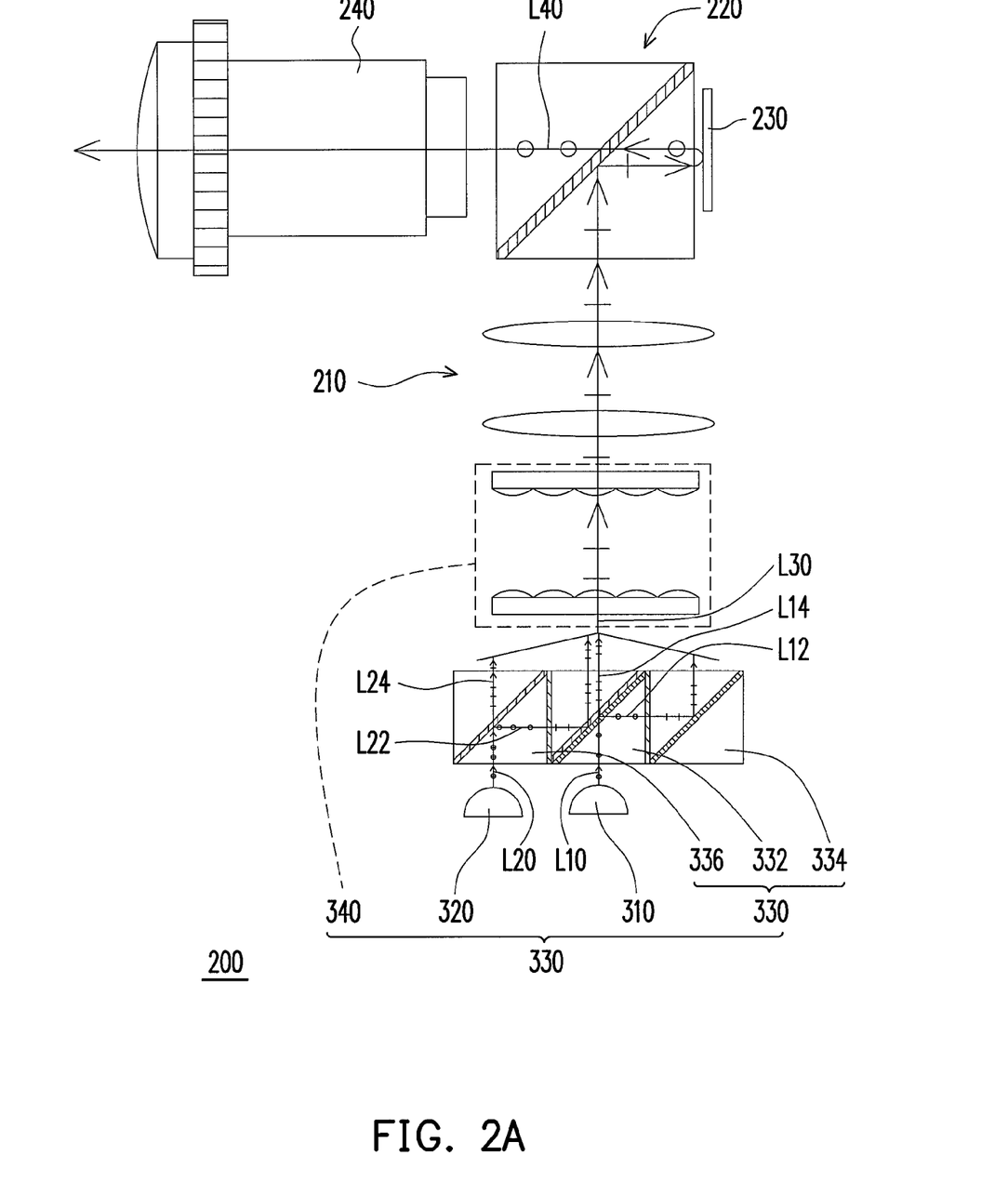
FIG. 2A is a diagram of an illumination module according to an embodiment of the present invention.
Figure 2B:
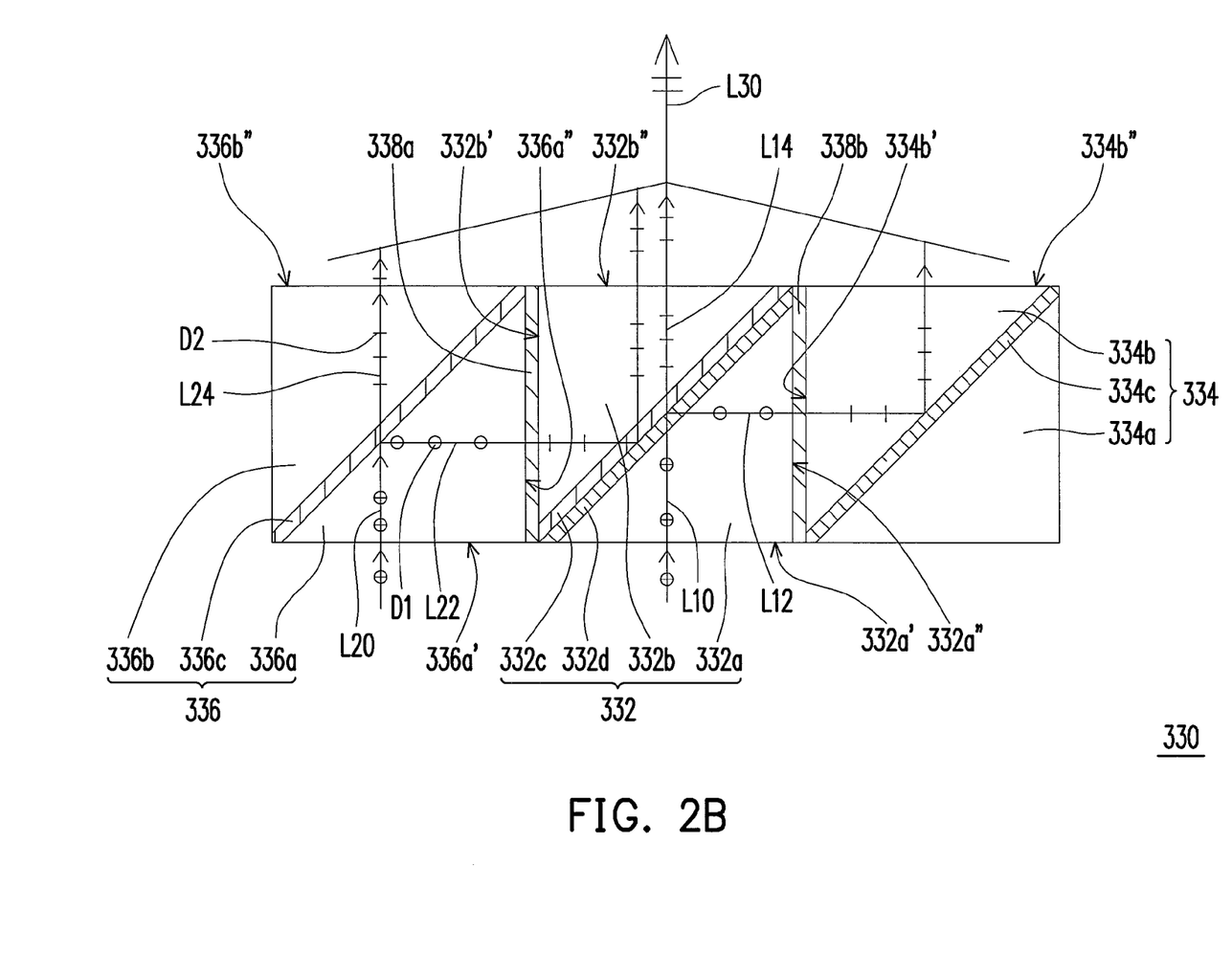
FIG. 2B is a diagram of the polarization beam splitting element (PBS element) of FIG. 2A.
Figure 2C:
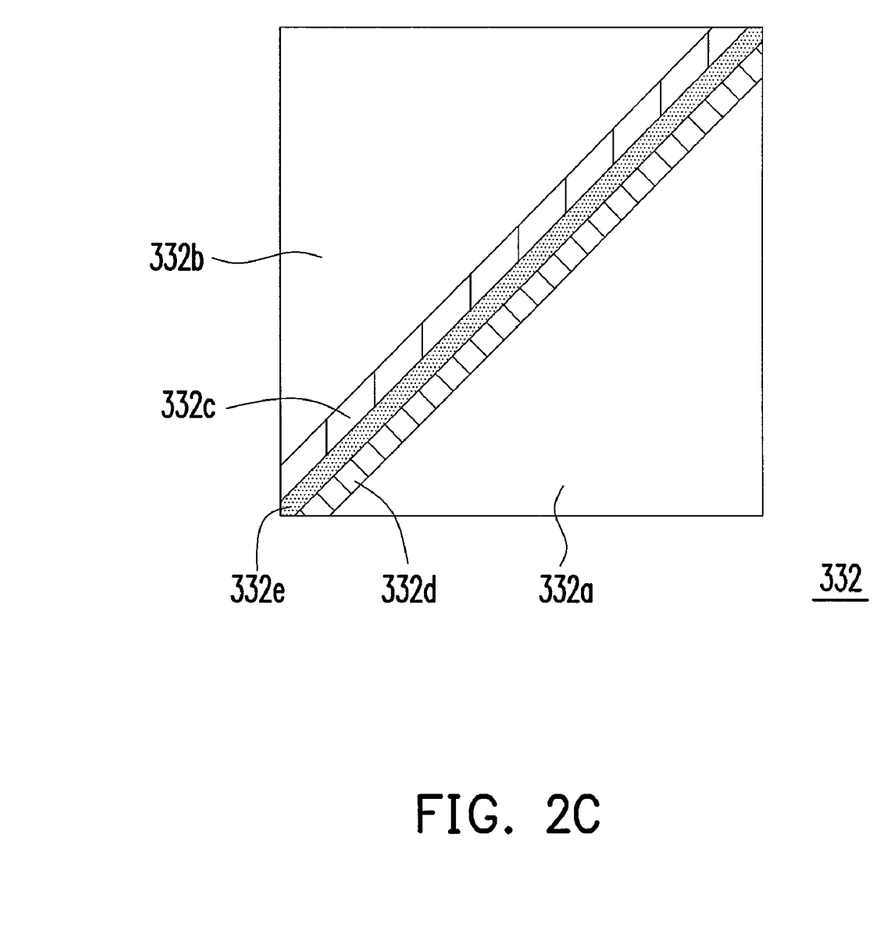
FIG. 2C is a diagram of the beam splitting and combining unit of FIG. 2A.

FIG. 2A is a diagram of an illumination module according to an embodiment of the present invention, FIG. 2B is a diagram of the polarization beam splitting element (PBS element) of FIG. 2A and FIG. 2C is a diagram of the beam splitting and combining unit of FIG. 2A. Referring to FIGS. 2A, 2B and 2C, a projection apparatus 200 includes an illumination module 300, a lens assembly 210, a second PBS unit 220, a light valve 230 and a projection lens 240. The illumination module 300 is able to emit a polarized light beam L30 and the lens assembly 210 is disposed in the optical path of the polarized light beam L30. The polarized light beam L30 sequentially passes through the lens assembly 210 and is reflected by the second PBS unit 220 onto the light valve 230. The second PBS unit 220 may be a polarization beam splitter (PBS). The light valve 230 converts the polarized light beam L30 into an image beam L40, and the image beam L40 passes through the second PBS unit 220 and then is incident upon the projection lens 240. The image beam L40 would be projected onto a screen (not shown) through the projection lens 240 to provide an image. The illumination module 300 includes at least one first dot light source 310, a second dot light source 320, a polarization conversion system 330 and a light-uniforming unit 340. The First dot light source 310 emits a non-polarized first light beam L10, while the second dot light source 320 emits a non-polarized second light beam L20, wherein the color of the first light beam L10 is different from that of the second light beam L20. The polarization conversion system 330 may convert the first light beam L10 and the second light beam L20 into a polarized light beam L30. The light-uniforming unit 340 is disposed in the optical paths of the first light beam L10 and the second light beam L20. In the embodiment, the light-uniforming unit 340 is disposed in the optical path of the polarized light beam L30, and the light-uniforming unit 340 is, for example, a lens array.

The polarization conversion system 330 includes at least one beam splitting and combining unit 332, a dichroic unit 334, a PBS unit 336, a first half wave plate 338*a* and a second half wave plate 338*b*, wherein the beam splitting and combining unit 332 includes a PBS element 332*c* and a dichroic element 332*d*, and the dichroic element 332*d* and the PBS element 332*c* are disposed substantially in parallel to each other. The beam splitting and combining unit 332 is disposed correspondingly to the first dot light source 310 so as to allow the first light beam L10 propagating onto the beam splitting and combining unit 332; the PBS unit 336 is disposed correspondingly to the second dot light source 320 so as to allow the second light beam L20 propagating onto upon the PBS unit 336. The beam splitting and combining unit 332 is disposed between the dichroic unit 334 and the PBS unit 336, the first half wave plate 338*a* is disposed between the beam splitting and combining unit 332 and the PBS unit 336. Additionally, the second half wave plate 338*b* is disposed between the beam splitting and combining unit 332 and the dichroic unit 334.

The first light beam L10 is incident upon the beam splitting and combining unit 332, and the PBS element 332*c* divides the first light beam L10 into a first portion beam L12 with a first polarization D1 and a second portion beam L14 with a second polarization D2. The second portion beam L14 passes through the PBS element 332*c*, and the first portion beam L12 is reflected by the PBS element 332*c* onto the second half wave plate 338*b*. The first portion beam L12 from the beam splitting and combining unit 332 passes through the second half wave plate 338*b*, then the polarization thereof is converted into the second polarization D2 and the first portion beam L12 is reflected by the dichroic unit 334.

The second light beam L20 is incident upon the PBS unit 336, and the PBS unit 336 divides the second light beam L20 into a third portion beam L22 with the first polarization D1 and a fourth portion beam L24 with the second polarization D2. The fourth portion beam L24 passes through the PBS unit 336, and the third portion beam L22 is reflected by the PBS unit 336 onto the first half wave plate 338*a*. The third portion beam L22 from the PBS unit 336 passes through the second half wave plate 338*b*, then the polarization thereof is converted into the second polarization D2 and the third portion beam L22 is reflected by the dichroic element 332*d*. The first portion beam L12 reflected by the dichroic unit 334, the second portion beam L14 passing through the beam splitting and combining unit 332, the third portion beam L22 reflected by the beam splitting and combining unit 332 and the fourth portion beam L24 passing through the PBS unit 336 together form the polarized light beam L30. The above-mentioned first polarization D1 may be S-polarization and the second polarization D2 may be P-polarization; but other implementations are allowed, for example, the first polarization D1 may be P-polarization and the second polarization D2 may be S-polarization. The color of the third portion beam L22 reflected by the above-mentioned dichroic element 332*d* is different from the color of the first portion beam L12 reflected by the dichroic unit 334.

Since the beam splitting and combining unit 332 and the PBS unit 336 in the embodiment are disposed respectively correspondingly to the first dot light source 310 and the second dot light source 320, thus, the first light beam L10 and the second light beam L20 are respectively incident upon the beam splitting and combining unit 332 and the PBS unit 336, so that there is no need to employ and dispose any absorbing element between the beam splitting and combining unit 332 and the PBS unit 336 for blocking leakage light at all. The above-mentioned feature further promotes the proportions for the first light beam L10 and the second light beam L20 to enter the polarization conversion system 330 and further promotes the efficiency of the illumination module 300 and the display quality of the projection apparatus 200. In the embodiment, the beam splitting and combining unit 332 may further include two prisms 332*a* and 332*b*, while the PBS element 332*c* may be disposed between the prism 332*b* and the dichroic element 332*d*, which makes the dichroic element 332*d* located between the PBS element 332*c* and the prism 332*a*, i.e., the dichroic element 332*d* is disposed in the optical path of the first portion beam L12 and between the first half wave plate 338*a* and the PBS element 332*c*. In addition to the above-mentioned dispositions, one skilled in the art may define other disposition manners of the PBS element 332*c* and the dichroic element 332*d*. For example, the dichroic element 332*d* may be disposed between the prism 332*b* and the PBS element 332*c* so as to make the PBS element 332*c* located between the dichroic element 332*d* and the prism 332*a*.

Specifically, the PBS element 332*c* and the dichroic element 332*d* are, for example, respectively a PBS film and a dichroic film. The PBS element 332*c* may be formed by using a film coating process to coat the above-mentioned PBS film on a surface of the prism 332*a* or the prism 332*b*; the dichroic element 332*d* may be formed by using the film coating process to coat the above-mentioned dichroic film on a surface of the prism 332*a* or the prism 332*b*. The prism 332*a* and the prism 332*b* may be adhered together through adhesive or by disposing an optical medium layer 332*e* having an appropriate refractive index between the dichroic element 332*d* and the PBS element 332*c* so as to promote the optical performance of the dichroic element 332*d* and the PBS element 332*c*.

In other embodiments however, the PBS element and the dichroic element may be respectively a grid-like polarization beam splitting plate (PBS plate) and a dichroic prism, or other appropriate polarization beam splitters (PBSs) and appropriate dichroic devices, wherein the beam splitting and combining unit does not need a prism to support the grid-like PBS plate and the dichroic prism.

The PBS unit 336 may include two prisms 336*a* and 336*b* and a PBS element 336*c*, and the PBS element 336*c* is disposed between the prism 336*a* and the prism 336*b*. The dichroic unit 334 may include two prisms 334*a* and 334*b* and a dichroic element 334*c*, and the dichroic element 334*c* is disposed between the prism 334*a* and the prism 334*b*.

Specifically, the PBS element 336*c* and the dichroic element 334*c* are, for example, respectively a PBS film and a dichroic film. The PBS element 336*c* may be formed by using a film coating process to coat the above-mentioned PBS film on a surface of the prism 336*a* or the prism 336*b*; the dichroic element 334*c* may be formed by using the film coating process to coat the above-mentioned dichroic film on a surface of the prism 334*a* or the prism 334*b*. In other embodiments however, the PBS element and the dichroic element may be respectively a grid-like polarization beam splitting plate (PBS plate) and a dichroic prism, or other appropriate PBSs and appropriate dichroic devices, wherein the PBS unit and the dichroic unit do not need a prism to support the grid-like PBS plate and the dichroic prism.

In more detail, in this embodiment, the beam splitting and combining unit 332, the dichroic unit 334 and the PBS unit 336 are substantially the same in volume and shape, wherein the prism 332a has a light incident surface 332a' and a light emitting surface 332a", and the prism 332b has a light incident surface 332b' and a light emitting surface 332b"; the prism 334b has a light incident surface 334b' and a light emitting surface 334b"; the prism 336a has a light incident surface 336a' and a light emitting surface 336a", and the prism 336b has a light incident surface 336b' and a light emitting surface 336b". The first half wave plate 338a is joined with the light emitting surface 336a" and the light incident surface 332b', and the second half wave plate 338b is joined with the light emitting surface 332a" and the light incident surface 334b'.

The first light beam L10 is incident upon the light incident surface 332a" and enters the beam splitting and combining unit 332, while the second portion beam L14 of the first light beam L10 departs from the light emitting surface 332b"; the first portion beam L12 of the first light beam L10 passes through the light emitting surface 332a", then is incident upon the second half wave plate 338b and enters the dichroic unit 334 through the light incident surface 334b', and departs from the light emitting surface 334b". The second light beam L20 is incident upon the light incident surface 336a' and enters the PBS unit 336, while the fourth portion beam L24 of the second light beam L20 departs from the light emitting surface 336b"; the third portion beam L22 of the second light beam L20 passes through the light emitting surface 336a", then is incident upon the first half wave plate 338a and enters the beam splitting and combining unit 332 through the light incident surface 332b', and departs from the light emitting surface 332b".

Figure 3:
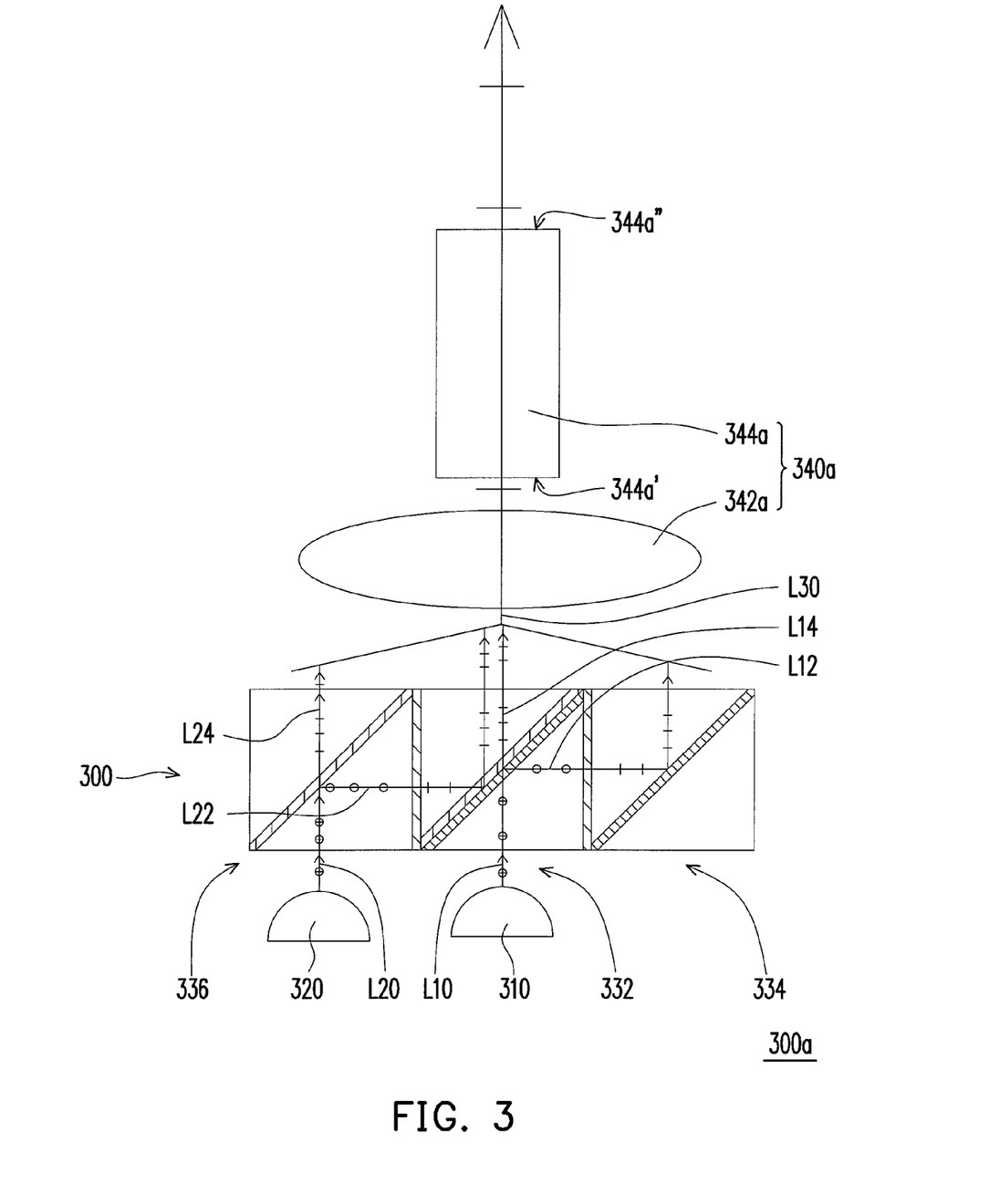
FIG. 3 is a diagram of an illumination module according to another embodiment of the present invention.

Note that in the embodiment the light-uniforming unit 340 is a lens array or implemented in other ways. FIG. 3 is a diagram of an illumination module according to another embodiment of the present invention. The present embodiment is similar to the embodiment of FIG. 2A. Therefore, all the same or similar elements in the embodiment and the embodiment of FIG. 2A are presented by the same marks. The differences of the embodiment from FIG. 2A are depicted in the following, while the same features are omitted for simplicity.

Referring to FIG. 3, the illumination module 300a in the embodiment has a light-uniforming unit 340a, which includes a focusing lens assembly 342a and a light integration rod 344a. The light integration rod 344a has a light incident end 344a' and a light emitting end 344a", and the focusing lens assembly 342a is disposed in the optical path of the polarized beam L30, so that the polarized beam L30 enters the light integration rod 344a through the light incident end 344a' and departs from the light emitting end 344a" for forming a uniform polarized beam L30.

Figure 4:
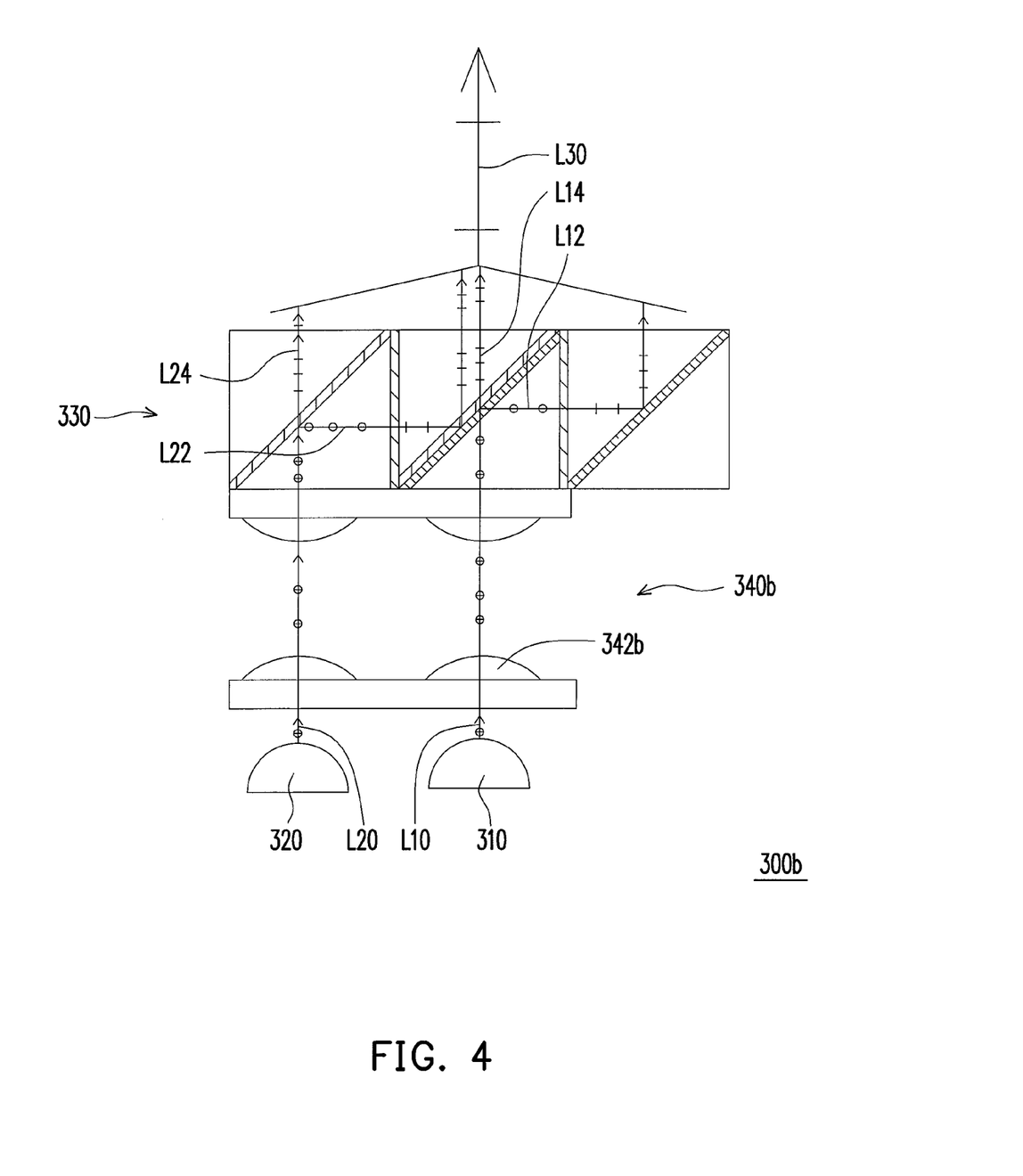
FIG. 4 is a diagram of an illumination module according to yet another embodiment of the present invention.

In addition, the light-uniforming unit 340 in the above-mentioned embodiment is disposed in the optical path of the polarized beam L30, but may be disposed in other ways as well. FIG. 4 is a diagram of an illumination module according to yet another embodiment of the present invention. The present embodiment is similar to the embodiment of FIG. 2A. Therefore, all the same or similar elements in the embodiment and the embodiment of FIG. 2A are presented by the same marks. The differences of the embodiment from FIG. 2A are depicted in the following, while the same features are omitted for simplicity.

Referring to FIG. 4, the illumination module 300b in the embodiment has a light-uniforming unit 340b, which is disposed in the optical paths of the first light beam L10 and the second light beam L20, and located between the first dot light source 310 and the polarization conversion system 330 as well as between the second dot light source 320 and the polarization conversion system 330. The light-uniforming unit 340b is, for example, a lens array, and each the lens 342b in the lens array is disposed correspondingly to the first dot light source 310 and the second dot light source 320 and respectively located the optical path of the first light beam L10 or the second light beam L20. In this way, after the first light beam L10 and the second light beam L20 are uniformed, the light beams L10 and L20 are still incident upon the beam splitting and combining unit 332 and the PBS unit 336.

Figure 5:
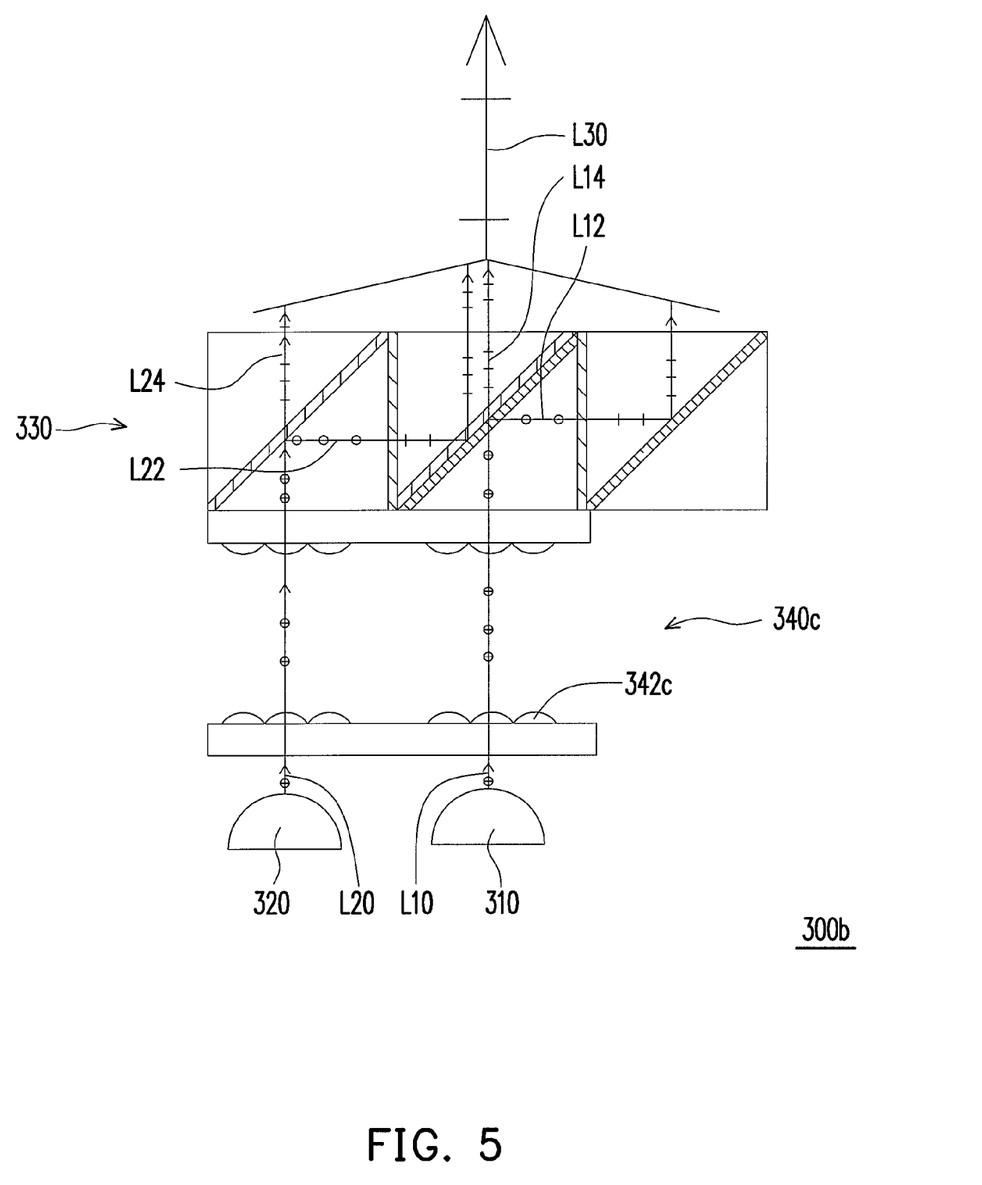
FIG. 5 is a diagram showing another implementation of the light-uniforming unit of FIG. 4.

Note that in the light-uniforming unit 340b shown in the FIG. 4, the first light beam L10 and the second light beam L20 are, but not limited in the present invention, respectively incident upon a lens 342b. FIG. 5 is a diagram showing another implementation of the light-uniforming unit of FIG. 4. Referring to FIG. 5, it may be seen the first light beam L10 or the second light beam L20 in the light-uniforming unit 340c may pass through a plurality of lenses 342c.

The above-mentioned first dot light source 310 and second dot light source 320 may respectively have a color different from each other. For example, the first dot light source 310 may be a blue dot light source and the second dot light source 320 is a red dot light source. In addition, in the above-described embodiments, each of the polarization conversion systems includes two dot light sources in association with a beam splitting and combining unit, a PBS unit and a dichroic unit, but the present invention does not limit the configuration of a polarization conversion system to the above-mentioned one.

Figure 6:
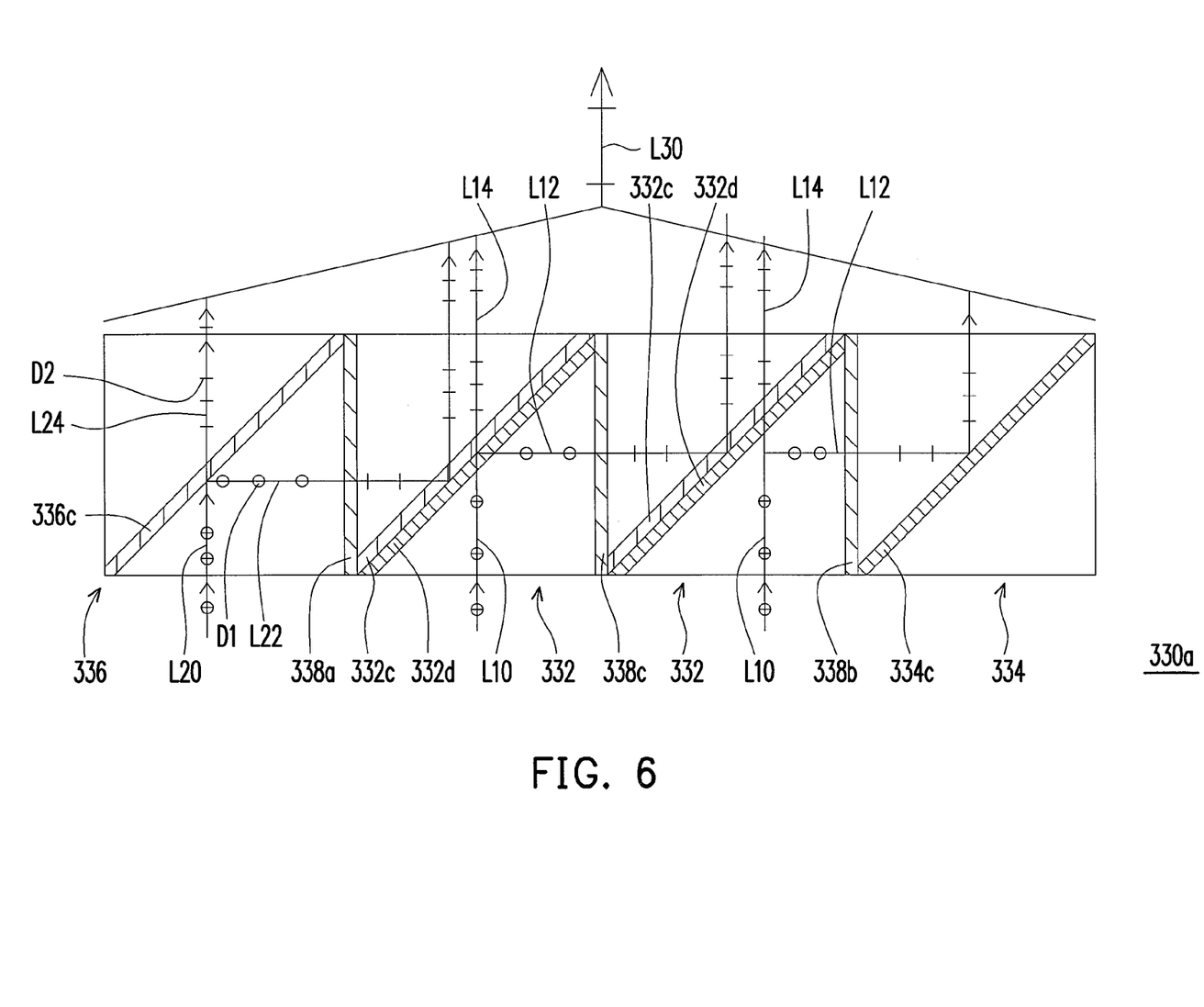
FIG. 6 is a diagram of a polarization conversion system according to an embodiment of the present invention.

FIG. 6 is a diagram of a polarization conversion system according to an embodiment of the present invention. The present embodiment is similar to the embodiment of FIG. 2A. Therefore, all the same or similar elements in the embodiment and the embodiment of FIG. 2A are presented by the same marks. The differences of the embodiment from FIG. 2A are depicted in the following, while the same features are omitted for simplicity.

Referring to FIG. 6, the unique of the embodiment of FIG. 6 rests in that the polarization conversion system 330a has two beam splitting and combining units 332 and at least one third half wave plate 338c disposed between the beam splitting and combining units 332; the number of at least one first dot light source is 2 (not shown) suitable to respectively emit a first light beam L10; each of the first light beams L10 is incident upon one of the two beam splitting and combining units 332 respectively. The polarization conversion system 330a is able to convert a plurality of first light beams L10 and the second light beam L20 into a polarized beam L30. After the first light beam L10 is incident upon the beam splitting and combining unit 332 adjacent to the first half wave plate 338a, the second portion beam L14 passes through the beam splitting and combining unit 332 and the first portion beam L12 is reflected onto the third half wave plate 338c; after the first portion beam L12 passes through the third half wave plate 338c to be converted into a polarized beam with the second polarization D2, the polarized beam is further reflected by the dichroic element 332d of another beam splitting and combining unit 332. Besides, the two dichroic elements 332d in the two adjacent beam splitting and combining units 332 respectively reflect a light beam with a color different from that of another light beam.

One skilled in the art should be able to apply the polarization conversion system of the present embodiment to a projection apparatus and an illumination module after referring the disclosed embodiment; for example, the polarization conversion system of the embodiments of FIGS. 2A-5 can be substituted by the polarization conversion system of FIG. 6.

Since the plurality of first light beams L10 in the embodiment is respectively corresponding to the plurality of beam splitting and combining units 332, in comparison with the prior art where each of first light beams L10 requires two corresponding optical elements (a reflection film and a PBS film) for functioning, therefore, the present embodiment may reduce the number of the employed elements. In other words, to convert N light beams, the polarization conversion system of the present embodiment merely needs (N+1) optical units, not 2N optical units required by the prior art, which contributes to compact the polarization conversion system and further lower the volume of a projector using the polarization conversion system of the embodiment.

In summary, the first light beam and the second light beam in the above-described embodiments are respectively incident upon the beam splitting and combining unit and the PBS unit, thus, the polarization conversion system does not need to dispose any absorbing elements, and both the first light beam and the second light beam emitted from the light sources have a higher proportion of the beam energy to enter the polarization conversion system. In this way, the usage efficiencies of the first light beam and the second light beam are promoted and the efficiency of the illumination module and the display quality of the projection apparatus are improved.

In addition, in comparison with the prior art, the polarization conversion system in each the above-described embodiment may use fewer optical units for converting light beams of a same number, which contributes to compact the polarization conversion system and further lower down the volume of the projector employing the polarization conversion system of the present embodiment.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A polarization conversion system for converting at least one non-polarized first light beam and a non-polarized second light beam into a polarized beam, comprising:
   at least one beam splitting and combining unit, comprising:
      a polarization beam splitting element for reflecting a first portion beam of the first light beam and allowing a second portion beam of the first light beam to pass through; and
      a dichroic element, disposed substantially in parallel to the polarization beam splitting element and allowing the first light beam to pass through; and
   a dichroic unit, disposed at a side of the beam splitting and combining unit for reflecting the first portion beam of the first light beam; and
   a polarization beam splitting unit, disposed at another side of the beam splitting and combining unit for reflecting a third portion beam of the second light beam and allowing a fourth portion beam of the second light beam to pass through, wherein the third portion beam from the polarization beam splitting unit is reflected by the dichroic element;
   a first half wave plate, disposed between the beam splitting and combining unit and the polarization beam splitting unit for converting the polarization of the third portion beam of the second light beam; and
   a second half wave plate, disposed between the beam splitting and combining unit and the dichroic unit for converting the polarization of the first portion beam of the first light beam, wherein the first portion beam, the second portion beam, the third portion beam and the fourth portion beam passing through the polarization conversion system form the polarized beam.

2. The polarization conversion system according to claim 1, further comprising at least one third half wave plate, wherein the number of the at least one first light beam is 2, the number of the at least one beam splitting and combining unit is 2, each the first light beam is incident upon each the beam splitting and combining unit and the third half wave plate is disposed between the two beam splitting and combining units.

3. The polarization conversion system according to claim 1, wherein the beam splitting and combining unit further comprises an optical medium disposed between the polarization beam splitting element and the dichroic element.

4. The polarization conversion system according to claim 1, wherein the dichroic element is disposed in an optical path of the first portion beam and located between the first half wave plate and the polarization beam splitting element.

5. The polarization conversion system according to claim 1, wherein the polarization beam splitting unit is a polarization beam splitting prism.

6. The polarization conversion system according to claim 1, wherein the dichroic unit is a dichroic prism.

7. The polarization conversion system according to claim 1, wherein the dichroic unit, the beam splitting and combining unit and the polarization beam splitting unit are substantially the same in volume.

8. An illumination module, comprising:
at least one first dot light source for emitting a non-polarized first light beam;
a second dot light source for emitting a non-polarized second light beam; and
a polarization conversion system for converting the first light beam and the second light beam into a polarized beam; the polarization conversion system comprising:
at least one beam splitting and combining unit, comprising:
a polarization beam splitting element for reflecting a first portion beam of the first light beam and allowing a second portion beam of the first light beam to pass through; and
a dichroic element, disposed substantially in parallel to the polarization beam splitting element and allowing the first light beam to pass through; and
a dichroic unit, disposed at a side of the beam splitting and combining unit for reflecting the first portion beam of the first light beam;
a polarization beam splitting unit, disposed at another side of the beam splitting and combining unit for reflecting a third portion beam of the second light beam and allowing a fourth portion beam of the second light beam to pass through, wherein the third portion beam from the polarization beam splitting unit is reflected by the dichroic element;
a first half wave plate, disposed between the beam splitting and combining unit and the polarization beam splitting element for converting the polarization of the third portion beam of the second light beam; and
a second half wave plate, disposed between the beam splitting and combining unit and the dichroic unit for converting the polarization of the first portion beam of the first light beam, wherein the first portion beam, the second portion beam, the third portion beam and the fourth portion beam passing through the polarization conversion system form the polarized beam; and
a light-uniforming unit disposed in the optical paths of the first light beam and the second light beam.

9. The illumination module according to claim 8, wherein the light-uniforming unit is disposed in an optical path of the polarized beam.

10. The illumination module according to claim 9, wherein the light-uniforming unit comprises a lens array.

11. The illumination module according to claim 9, wherein the light-uniforming unit comprises:
a focusing lens disposed in the optical path of the polarized beam; and
a light integration rod disposed in the optical path of the polarized beam from the focusing lens.

12. The illumination module according to claim 8, wherein the light-uniforming unit is disposed between the first dot light source and the polarization conversion system as well as between the second dot light source and the polarization conversion system.

13. The illumination module according to claim 12, wherein the light-uniforming unit comprises a lens array.

14. The illumination module according to claim 8, wherein the polarization conversion system further comprises at least one third half wave plate, the number of the at least one first light beam is 2 for respectively emitting the non-polarized first light beam, the number of the beam splitting and combining unit is 2, each the first light beam is incident upon each the beam splitting and combining unit and the third half wave plate is disposed between the two beam splitting and combining units.

15. The illumination module according to claim 8, wherein the beam splitting and combining unit further comprises an optical medium disposed between the polarization beam splitting element and the dichroic element.

16. The illumination module according to claim 8, wherein the dichroic element is disposed in the optical path of the first portion beam and located between the first half wave plate and the polarization beam splitting element.

17. The illumination module according to claim 8, wherein the polarization beam splitting unit is a polarization beam splitting prism.

18. The illumination module according to claim 8, wherein the dichroic unit is a dichroic prism.

19. The illumination module according to claim 8, wherein the dichroic unit, the beam splitting and combining unit and the polarization beam splitting unit are substantially the same in volume.

* * * * *